United States Patent [19]

Stevens et al.

[11] 4,142,421
[45] Mar. 6, 1979

[54] TRANSMISSION ARRANGEMENT

[75] Inventors: W. Gene Stevens, Dunlap; Raymond P. Cobb, Washington, both of Ill.

[73] Assignee: Caterpillar Tractor Co., Peoria, Ill.

[21] Appl. No.: 831,018

[22] Filed: Sep. 6, 1977

[51] Int. Cl.² ............................... F16H 37/00; F02B 77/00
[52] U.S. Cl. .................................. 74/15.63; 123/198 R
[58] Field of Search ............................ 192/112, 113.6; 74/15.63, 15.6, 694, 700, 701; 123/198 R; 180/6.2, 70 R

[56] References Cited

U.S. PATENT DOCUMENTS

| | | | |
|---|---|---|---|
| 2,618,979 | 11/1952 | Benning | 74/15.63 X |
| 3,613,848 | 10/1971 | Reiff | 192/113 B X |
| 3,952,606 | 4/1976 | Schulz | 74/377 |
| 3,964,585 | 6/1976 | Murayama et al. | 192/113 B X |
| 4,022,298 | 5/1977 | Malinowski | 192/113 B X |
| 4,031,762 | 6/1977 | Shellberg | 74/15.63 |

*Primary Examiner*—Leonard H. Gerin
*Attorney, Agent, or Firm*—Charles E. Lanchantin, Jr.

[57] ABSTRACT

A transmission arrangement for a vehicle includes a housing assembly mounted on the rear end of the vehicle, a tubular transmission input shaft supported substantially within the housing assembly, an engine driven shaft extending through the transmission input shaft, and an input clutch assembly connected between the engine driven shaft and the transmission input shaft for selectively coupling them together, the input clutch assembly being adjacent and accessible through a rear cover of the housing assembly.

16 Claims, 3 Drawing Figures

TRANSMISSION ARRANGEMENT

BACKGROUND OF THE INVENTION

The present invention is related to a transmission arrangement for a vehicle, and more particularly to a transmission arrangement which is located at the rear end of the vehicle in order to facilitate its servicing.

Heretofore, transmissions for vehicles such as large earthmoving tractors have been difficult to service. For example, they are usually disposed in the central portion of the vehicle immediately behind the engine so that it is necessary to disconnect substantial portions of the operator station or frame to enable the transmission to be lifted or lowered from within the confines of the vehicle. Many of these transmissions include a flywheel clutch or an input clutch located at the front end thereof which is frequently in need of repair. However, in order to get at it, the removal of the engine, transmission or both is required so that it is a costly servicing problem. These input clutch servicing problems become more severe when an accessory such as a winch is driven by the transmission, for the input clutch is then subjected to greater wear during its more frequent engagement.

SUMMARY OF THE INVENTION

The present invention is directed to overcoming one or more of the problems as set forth above.

According to the present invention there is provided a transmission arrangement for a vehicle including a housing assembly mounted on the rear end of the vehicle, a tubular transmission input shaft supported substantially within the housing assembly, an engine driven shaft extending through the transmission input shaft, and an input clutch assembly connected between the engine driven shaft and the transmission input shaft for selectively coupling them together, the input clutch assembly being adjacent and accessible through a rear cover of the housing assembly.

BRIEF DESCRIPTION OF THE DRAWINGS

FIG. 3 is an enlarged and vertically sectionalized fragmentary view of an alternate embodiment input clutch which may be compared with FIG. 2.

DETAILED DESCRIPTION

Figure 1:
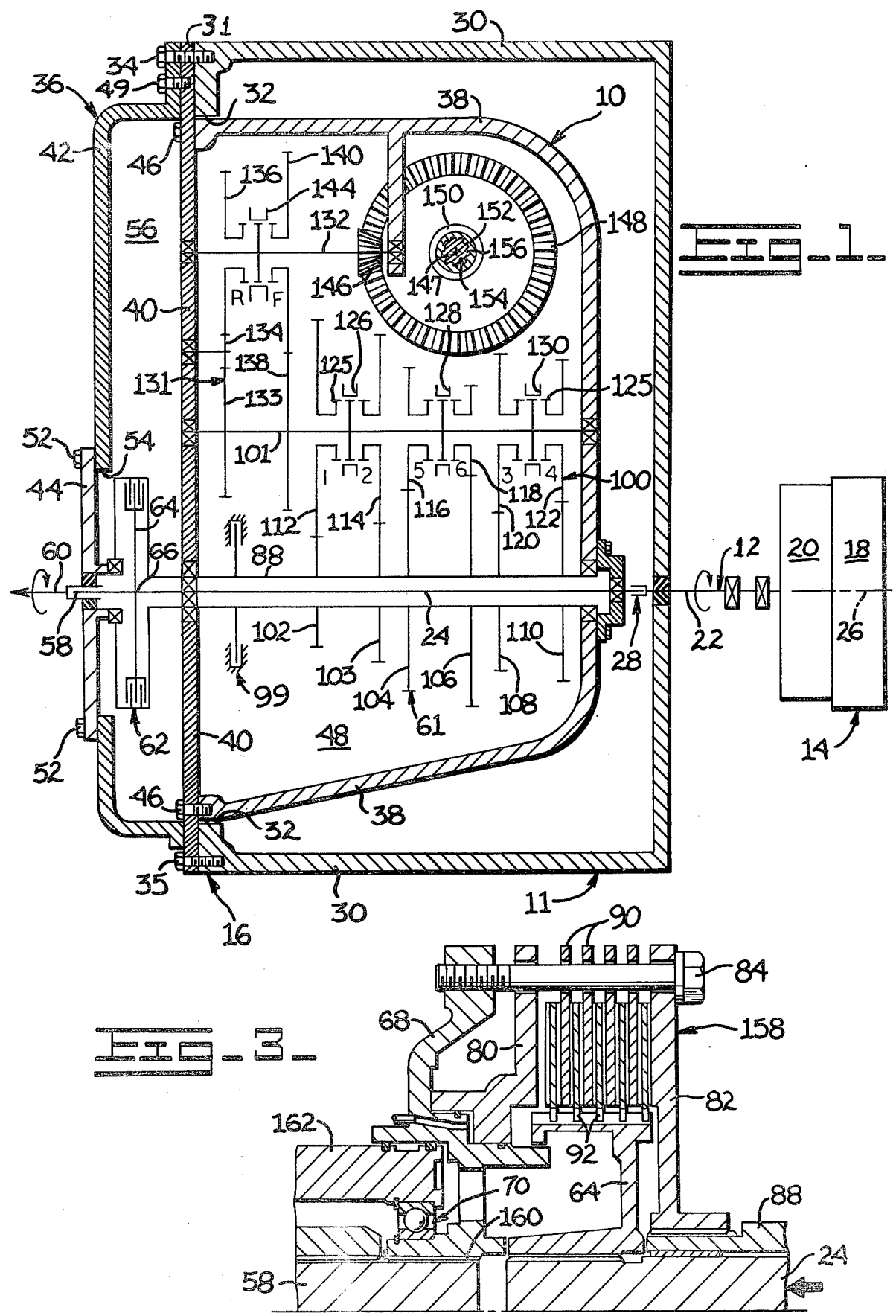
FIG. 1 is a diagrammatic side elevational view of a transmission arrangement constructed in accordance with the present invention with certain portions of a supporting housing assembly sectionalized to show the serviceability thereof.

Referring initially to FIG. 1 of the drawings, there is shown a transmission arrangement 10 for a vehicle 11 forming a substantial portion of a vehicle power train 12. The power train is particularly useful in a vehicle such as the relatively large track-type tractor disclosed in U.S. Pat. No. 3,871,462, issued Mar. 18, 1975 to R. L. Krolak et al. Accordingly, the vehicle has a front end 14 and a rear end 16, disposed generally to the right and left sides respectively when viewing FIG. 1, which corresponds to a normal longitudinal direction of movement of the vehicle.

Preferably, the vehicle power train includes an engine 18, a flywheel and accessory drive housing 20, and an engine output shaft 22 which is continuously driven by the engine. The transmission arrangement 10 includes an engine driven shaft 24 arranged on a common and substantially longitudinal axis 26 with the engine output shaft, and connected thereto by an axially splined slip joint identified generally by the reference numeral 28.

The rear end 16 of the vehicle provides a frame or case 30, as is diagrammatically indicated, defining an upright rear mounting face 31 peripherally disposed about a relatively large rear opening 32. Advantageously, the transmission arrangement 10 extends forwardly into the case through this opening, and is releasably secured thereto by a plurality of relatively long retaining members or capscrews 34 and a plurality of relatively short retaining members or capscrews 35 disposed in alternating and encircling relation about the opening as may be appreciated by reference to the upper and lower left hand portions of FIG. 1 respectively.

More particularly, the transmission arrangement 10 includes a housing assembly 36 having four major elements, namely a bevel gear and transmission case 38, an upright mounting plate and wall member 40, a relatively large cover 42, and a relatively smaller clutch service cover or rear cover 44. It is apparent from FIG. 1 that the transmission case 38 and the mounting plate 40 are releasably connected together by a plurality of encircling retaining elements or capscrews 46 to define a relatively large internal chamber 48. Similarly, the large cover 42 is releasably secured to the rear of the mounting plate 40 by the plurality of capscrews 34 and a plurality of relatively short capscrews 49, and the small cover 44 is releasably secured to the rear of the large cover by a plurality of capscrews 52 disposed generally about an access opening 54 symmetrically arranged along the axis 26. Collectively, the large and small covers define with the mounting plate a rearwardly disposed and smaller internal chamber 56.

Figure 2:
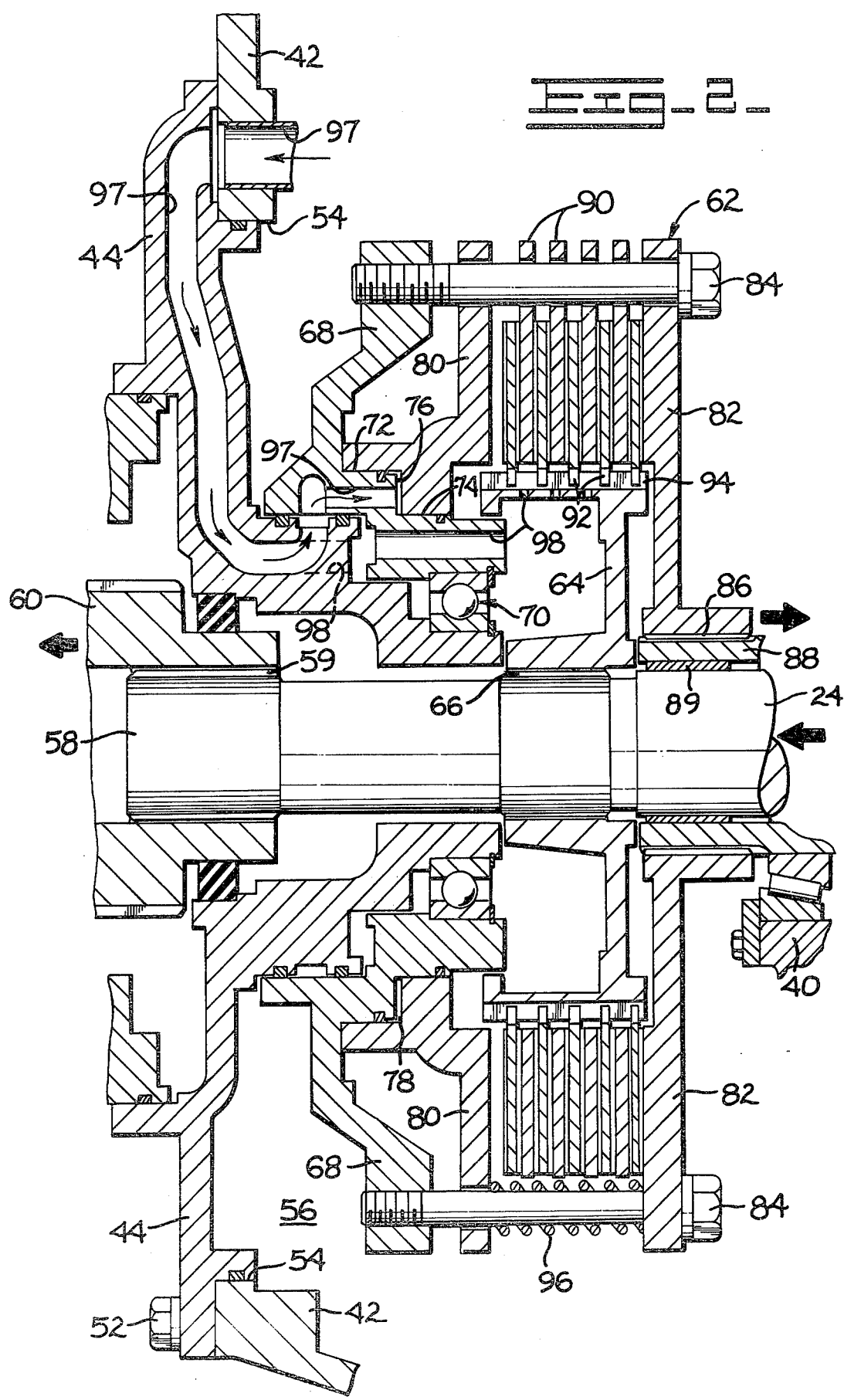
FIG. 2 is an enlarged and vertically sectionalized view of a lower rear portion of the transmission arrangement of FIG. 1, and particularly showing the construction of an input clutch.

Turning now to the operating portion of the transmission arrangement 10, it is to be recognized that the engine driven shaft 24 has a proximal end which extends through the case 30 and leftwardly when viewing FIG. 1 to terminate at a distal end which extends through the transmission mounting plate 40 and substantially outwardly through the small cover 44. Thus, the distal end of this shaft provides an enginedriven, power take-off (PTO) member 58. As best shown in FIG. 2, such PTO member preferably includes axially oriented splines 59 for slip jointed coupling to a member 60 forming the input driving element of a vehicle accessory such as a conventional winch or the like, not shown.

Basically, the transmission arrangement 10 includes a constant mesh transmission 61 disposed in the large chamber 48 and a transmission input clutch or clutch assembly 62 disposed in the small chamber 56. The input clutch is concentrically arranged along the axis 26 and has an input member 64 splined to the engine driven shaft 24 as at 66. As best shown in FIG. 2, the input clutch has a rear member 68 which is supported for rotation on the clutch service cover 44 by an antifriction or rolling bearing assembly 70. Such rear member has a pair of cylindrical walls 72 and 74, and a step surface 76 therebetween which forms an engagement chamber 78 with an axially reciprocal piston 80. A front member 82 is connected for rotation with the rear member 68 and with the piston by a plurality of axially oriented and peripherally spaced retaining bolts 84 to thus define a rotating housing assembly in use. The front member has a plurality of output drive splines 86 thereon which are in driving communication with a first end of a tubular transmission input shaft 88 and is effectively supported thereby. A bearing element or bushing 89 is mounted thereat between the engine driven shaft 24 and the transmission input shaft so that the engine drive shaft 24 is effectively supported thereby. Along with the piston, a plurality of annular plates 90 are pierced by the bolts 84 and are axially movable thereon. These plates are interleaved with a corresponding plurality of annular discs 92 with grooved friction material thereon, with the discs being radially inwardly connected for rotation with the input member 64 on the splines or teeth 94. As shown at the bottom of FIG. 2, a plurality of coiled compression springs 96 are mounted about a number of the circumferentially spaced bolts 84 and are connected between the front member 82 and the piston 80 for retracting the piston in the absence of sufficient fluid pressure in the engagement chamber 78. In this regard it is to be appreciated that a plurality of serially related clutch engagement passages identified generally by the reference numeral 97 permit fluid under a preselected pressure to be communicated from a transmission control system of the usual type, not shown, to the engagement chamber 78 for selective actuation of the input clutch 62. Another group of serially related cooling fluid access passages identified generally by the reference numeral 98 advantageously permits a cooling fluid to be communicated from the transmission control system radially outwardly to the interleaved plates and discs to extend the service life thereof. This is advantageous in that cooling fluid is controllably supplied to the center of the input clutch under a preselected pressure through the passages 98 while the input clutch is fully engaged or partially engaged and slipping. Accordingly, positive flow of cooling fluid and substantial cooling capability is effected conveniently within the rear chamber 56.

Referring again to FIG. 1, a brake identified generally by the reference number 99 is diagrammatically shown as being disposed substantially at the first or rear end of the tubular transmission input shaft 88. During shifting of the transmission arrangement 10 brake 99 is engaged subsequent to disengagement of the input clutch 62. With engagement thereof, the transmission input shaft is effectively braked to the rear wall member 40 to facilitate gear shifting of various elements of the transmission 61.

First gear means 100 are provided in the constant mesh transmission 61 to selectively couple the input shaft 88 with an intermediate shaft 101. Six input drive gears 102, 103, 104, 106, 108 and 110 are serially secured to the transmission input shaft 88 at axially spaced points from the first end to the second or front end thereof. These drive gears are respectively connected in constant mesh relationship with a corresponding number of driven gears 112, 114, 116, 118, 120 and 122 selectively connected to and mounted on the longitudinally oriented intermediate shaft 101, which shaft is disposed generally elevationally above and parallel to the main axis 26. Each of the driven gears has a plurality of coupling splines 125 thereon of the usual type as diagrammatically indicated to permit one of the driven gears to be selectively connected to the intermediate shaft. Such connection is accomplished by axial movement of at least one of three shift collars 126, 128 and 130 which are continuously connected to the intermediate shaft.

For example, and as marked in FIG. 1, movement of the shift collar 126 rearwardly from its centered neutral position or to the left when viewing the drawing will directly couple the driven gear 112 to the intermediate shaft 101 to effect a first speed ratio. Alternately, movement of the same shift collar fully to the right will couple the driven gear 114 to the intermediate shaft to effect a second speed ratio. Similarly, movement of the second shift collar 128 to the left or right will respectively provide either a fifth or sixth speed ratio, and movement of the third shift collar 130 to the left or right will respectively provide either a third or fourth speed ratio.

Second gear means 131 are provided in the transmission 61 to selectively couple the intermediate shaft 101 to an output shaft 132. The intermediate transmission shaft has a gear 133 secured to the rearward end thereof which is in constant driving communication with an idler gear 134 and a reverse output gear 136. Another gear 138 is secured to the intermediate shaft adjacent to gear 133 and is in driving communication with a forward output gear 140. When not in use the reverse and forward output gears are freely rotatably mounted on the longitudinally oriented output shaft 132 located generally elevationally above the intermediate shaft. They are selectively connected to the output shaft by a single sliding shift collar 144. Axial movement of the collar fully to the left will effect splined coupling of the reverse gear to the output shaft, while movement thereof from its central uncoupled position fully to the right will provide coupling of the forward gear thereto.

A forwardly facing output drive pinion 146 is secured to the output shaft 132 and is drivingly connected to a bevel gear 148 advantageously disposed within the housing assembly 36. The bevel gear has a transverse axis 147 and is rotatably mounted within the case 38 for rotation in a generally longitudinal plane by a pair of antifriction bearing assemblies 150 individually straddling a hollow shaft 152 extending laterally outwardly from the opposite sides of the bevel gear, only one shown. A pair of transversely oriented cross shafts 154, again only one shown, extend laterally inwardly into the case 38 from the opposite sides of the vehicle and are each received within the respective shafts 152 at a spline connection 156.

OPERATION

In operation, the engine driven shaft 24 extends rearwardly through the tubular transmission shaft 88 fully from the second to the first end thereof, and provides a continuously driven power take-off member 58 at its distal end. Advantageously, it makes no difference as to whether the input clutch 62 is engaged or disengaged. Particularly, if the input clutch is disengaged there are virtually no drag horsepower losses in the main portion of the transmission 61, and thus more effective horsepower is directly available to any accessory driven by the power take-off member. In contrast, prior art arrangements have had the transmission input clutch disposed in series between the engine flywheel and the driven shaft so that it was heretofor necessary to engage the input clutch in order to obtain driving power to both the transmission input shaft and the power take-off shaft. With such prior construction the input clutch is subject to greater wear and a considerable number of bearings and intermeshing gears are often uselessly rotating in the disengaged transmission when only the power take-off is being utilized.

During normal vehicle travel, however, the input clutch 62 is engaged and the brake 99 disengaged so that power is provided to the input shaft 88. Power is subsequently directed in series between the first gear means 100 and the second gear means 131 to drive the output drive pinion 146 in the preselected speed ratio and desired direction. If a speed shift is made the input clutch is disengaged and the brake 99 engaged to retard or stop the input shaft sufficient for more effective disengagement and reengagement of the shift collars 126, 128, and 130 of the first gear means. This provides power flow through a new one of the driven gears 112, 114, 116, 118, 120 or 122 and a new speed for the intermediate shaft 101 upon release of the brake and reengagement of the input clutch. A direction change requires substantially this same sequential action as a speed shift, with the shift collar 144 of the second gear means being uncoupled and recoupled with the input shaft being at least partially disconnected from the engine driven shaft 24.

The input clutch 62 is mounted on the distal end of the driven shaft 24 so that it may be conveniently serviced independently of the major portion of the transmission arrangement 10. Specifically, as best shown in FIG. 2, such clutch may be serviced by removal of the capscrews 52 and rearward movement of the clutch service cover 44 relative to the large cover 42. This action subsequently enables the withdrawing of the entire input clutch from within the small rear chamber 56 and outwardly through the access opening 54 because the bearing assembly 70 effectively couples the rear member 68 to the service cover. Note is made that the input gear 64 simultaneously separates axially off the splines 66, and the front member 82 slides off the splines 86 so that complete separation of the input clutch from the driven shaft is achieved. This permits the input clutch to be easily serviced externally without a major breakdown of the transmission arrangement and while keeping the major portion thereof effectively protected within the large chamber 48.

On the other hand, if it is desired to remove the entire transmission arrangement 10 from the vehicle, the aligned cross shafts 154 shown in FIG. 1 are laterally withdrawn outwardly from the opposite sides of the vehicle. Subsequently, removal of the retaining members 34 and 35 will allow the entire housing assembly 36, the transmission 61, and the input clutch 62 to be axially withdrawn as a unit from within the main frame 30 and rearwardly through the opening 32. This contrasts to the usual technique of vertically removing the transmission arrangement after taking a considerable number of complicated and expensive preparatory service steps.

ALTERNATE EMBODIMENT

In the embodiment of FIG. 3 an input clutch 158 is shown which differs in construction from the preferred embodiment in that the distal or rearward end of the engine driven shaft 24 is not directly connected to the power take-off member 58. Many other similarities exist, however, and for this reason similar reference numerals have been applied to the embodiment of FIG. 3 which correspond to substantially identical elements in FIG. 2.

More specifically, power is communicated as previously described to the transmission input shaft 88 via the input gear 64, the interleaved plates 90 and discs 92 as a result of the engagement of the piston 80, and the front member 82. Power is likewise only communicated to the power take-off member 58 when the clutch is engaged via the rotating rear member 68 and the connection at a spline joint 160. While a rear access cover 162 is modified to mount the bearing assembly 70 radially within it, it is still substantially similar to the preferred cover 44. For instance, removal or leftward movement of the cover 162 will result in corresponding axial displacement of the bearing assembly 70, the rear member 68, the front member 82, and the input gear 64 and, in fact, the entire input clutch 158 as a unit for servicing as was the case for the preferred embodiment.

Other aspects, objects and advantages will become apparent from a study of the specification, drawings and appended claims.

The embodiments of the invention in which an exclusive property or privilege is claimed are defined as follows:

1. A transmission arrangement for a vehicle having a front end and a rear end corresponding to a normal longitudinal direction of movement, comprising:
   a housing assembly having a rear cover, said housing assembly being mounted on said rear end of the vehicle;
   a tubular transmission input shaft supported substantially within said housing assembly;
   an engine driven shaft extending through said transmission input shaft; and
   input clutch means disposed within said housing assembly and connected between said engine driven shaft and said transmission input shaft for selectively coupling them together, said input clutch means being adjacent and accessible through said rear cover of the housing assembly.

2. The transmission arrangement of claim 1 wherein said tubular transmission input shaft is disposed on a substantially longitudinally oriented axis and has a front end and a rear end, said engine driven shaft extending rearwardly fully through said front and rear ends of said transmission input shaft.

3. The transmission arrangement of claim 2 wherein said engine driven shaft has a distal rear end and a power take-off member on said distal rear end, said power take-off member being rotatable independent of operation of said input clutch means.

4. The transmission arrangement of claim 2 wherein said engine driven shaft has a distal rear end and a clutch input member connected to said engine driven shaft adjacent said distal rear end, said input clutch means including a rotatable housing assembly and a plurality of interleaved plates, said plates being of a construction sufficient for alternate connection to said clutch input member and said rotatable housing assembly.

5. The transmission arrangement of claim 1 wherein said vehicle has a rearwardly disposed vehicle case and a rear opening defined in said vehicle case, said housing assembly being of a construction sufficient for extending forwardly through said opening and being releasably secured to said vehicle case about the peripheral of said opening.

6. The transmission arrangement of claim 5 wherein said housing assembly has a mounting plate, a bevel gear and transmission case, said mounting plate being removably connected to said vehicle case, and said bevel gear and transmission case being removably connected to said mounting plate.

7. The transmission arrangement of claim 6 wherein said housing assembly has a first cover connected to said mounting plate, said rear cover being removably secured to said first cover.

8. The transmission arrangement of claim 7 wherein said mounting plate, said first cover and said rear cover collectively define a relatively small rear chamber, said input clutch means being disposed substantially within said rear chamber.

9. The transmission arrangement of claim 1 including a transmission output shaft, a pinion connected to said transmission output shaft, and a bevel gear driven by said pinion, said transmission output shaft, said pinion and said bevel gear being mounted within said housing assembly.

10. The transmission arrangement of claim 9 including an intermediate shaft, first gear means for selectively coupling said transmission input shaft to said intermediate shaft for driving said intermediate shaft in any one of a plurality of speed ratios, and second gear means for selectively coupling said intermediate shaft to said transmission output shaft for driving said pinion in forward and reverse.

11. A transmission arrangement for vehicle having a rear end corresponding to a normal longitudinal direction of movement, comprising:
 a housing assembly having first and second walls defining a chamber located at the rear end of the vehicle;
 a transmission input clutch assembly disposed in said rear chamber;
 input drive means extending rearwardly through said first wall for driving said input clutch assembly;
 output drive means extending forwardly through said first wall and connected to said input clutch assembly for driving said vehicle.

12. The transmission arrangement of claim 11 including power take-off shaft means connected to said input clutch assembly and extending rearwardly through said second wall.

13. The transmission arrangement of claim 12 wherein said input clutch assembly has a plurality of interleaved plates alternately connected to said input drive means and to said output drive means, means for selectively engaging said plates together and separating said plates to respectively effect an engaged and a disengaged position of said input clutch assembly, wherein said power take-off shaft means rotates only when said input clutch assembly is in said engaged position.

14. The transmission arrangement of claim 11 including power take-off shaft means drivingly connected with said input drive means for rotation therewith.

15. The transmission arrangement of claim 14 wherein said input clutch assembly has a plurality of interleaved plates alternately connected to said input drive means and to said output drive means, means for selectively engaging said plates together and separating said plates to respectively effect an engaged and a disengaged position of said input clutch assembly, wherein said power take-off shaft means rotates independently of said engaged and disengaged positions of said input clutch assembly.

16. The transmission arrangement of claim 11 wherein said input clutch assembly has a plurality of interleaved plates alternately connected to said input drive means and to said output drive means, means for selectively engaging said plates together and separating said plates to respectively effect an engaged and a disengaged position of said input clutch assembly, and means for directing a cooling fluid under pressure to the center of said input clutch assembly and providing positive flow thereof radially outwardly to said plates.

* * * * *

Disclaimer 4,142,421.—*W. Gene Stevens*, Dunlap; and *Raymond P. Cobb*, Washington, Ill. TRANSMISSION ARRANGEMENT. Patent dated Mar. 6, 1979. Disclaimer filed Apr. 7, 1986, by the assignee, *Caterpillar Tractor Co.*

Hereby enters this disclaimer to claims 1, 2, 4, 9, 10 and 11 of said patent.

[*Official Gazette June 17, 1986.*]